US012812007B2

(12) United States Patent
Chen et al.

(10) Patent No.: US 12,812,007 B2
(45) Date of Patent: Nov. 24, 2026

(54) MODEL TRAINING SYSTEM AND METHOD, AND STORAGE MEDIUM

(71) Applicant: Huawei Cloud Computing Technologies Co., Ltd., Guizhou (CN)

(72) Inventors: Pu Chen, Shenzhen (CN); Qiaobo Liao, Gui'an (CN)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 54 days.

(21) Appl. No.: 18/956,281

(22) Filed: Nov. 22, 2024

(65) Prior Publication Data

US 2025/0088556 A1 Mar. 13, 2025

Related U.S. Application Data

(63) Continuation of application No. 16/883,026, filed on May 26, 2020, now Pat. No. 12,184,725, which is a (Continued)

(30) Foreign Application Priority Data

Nov. 29, 2017 (CN) ........................ 201711227185.X

(51) Int. Cl.
*H04L 67/1097* (2022.01)
*G06F 21/62* (2013.01)
*H04L 9/40* (2022.01)

(52) U.S. Cl.
CPC ...... *H04L 67/1097* (2013.01); *G06F 21/6218* (2013.01); *H04L 63/0807* (2013.01)

(58) Field of Classification Search
CPC ............. H04L 67/1097; H04L 63/0807; H04L 63/0884; G06F 21/6218; G06F 16/9017; (Continued)

(56) References Cited

U.S. PATENT DOCUMENTS 8,521,664 B1 8/2013 Lin et al.
8,706,659 B1 4/2014 Mann et al.
(Continued)

FOREIGN PATENT DOCUMENTS

CN 103389719 A 11/2013
CN 105426857 A 3/2016
(Continued)

OTHER PUBLICATIONS

Amazon Web Services, "Amazon Machine Learning Developer Guide. 2017. Accessed via the Wayback Machine on Mar. 6, 2026 at https://web.archive.org/web/20171025162849/http://docs.aws.amazon.com/machine-learning/latest/dg/what-is-amazon-machine-learning.html" (Year: 2017).*
(Continued)

*Primary Examiner* — Michael R Vaughan
(74) *Attorney, Agent, or Firm* — Rimon PC

(57) ABSTRACT

A model training system includes a cloud data storage platform and a cloud model training platform. The cloud data storage platform is configured to: store training data; and receive a training data calling request, and export training data corresponding to a data calling instruction to the cloud model training platform based on the training data calling request. The cloud model training platform is configured to: receive a model training creation instruction to obtain a to-be-trained model; generate the training data calling request, and send the training data calling request to the cloud data storage platform; and train the to-be-trained model by using the training data exported from the cloud data storage platform, to obtain a training result model. In the technical solutions of the present invention, a risk of leaking training data can be reduced.

20 Claims, 5 Drawing Sheets

Related U.S. Application Data continuation of application No. PCT/CN2018/114082, filed on Nov. 6, 2018.

(58) Field of Classification Search
CPC . G06F 16/9032; G06F 16/9038; G06N 20/00; G06N 3/08; G06N 5/04
See application file for complete search history.

(56) References Cited

U.S. PATENT DOCUMENTS

| | | | |
|---|---|---|---|
| 9,338,157 | B1 | 5/2016 | Vazquez |
| 9,483,740 | B1 | 11/2016 | Ansel |
| 10,810,169 | B1 | 10/2020 | Chung |
| 11,455,523 | B2 | 9/2022 | Endoh |
| 11,537,439 | B1 | 12/2022 | Liberty |
| 2005/0226495 | A1 | 10/2005 | Li |
| 2012/0284600 | A1 | 11/2012 | Lin et al. |
| 2016/0019324 | A1 | 1/2016 | Kanderian et al. |
| 2016/0335550 | A1 | 11/2016 | Achin et al. |
| 2016/0350648 | A1 | 12/2016 | Gilad-Bachrach et al. |
| 2017/0061311 | A1 | 3/2017 | Liu |
| 2017/0091657 | A1 | 3/2017 | Kida |
| 2017/0154113 | A1 | 6/2017 | Yu et al. |
| 2017/0178020 | A1 | 6/2017 | Duggan et al. |
| 2017/0213156 | A1 | 7/2017 | Hammond et al. |
| 2017/0329829 | A1 | 11/2017 | Dispensa et al. |
| 2018/0239904 | A1 | 8/2018 | Kiner |
| 2018/0314984 | A1 | 11/2018 | Wiener |
| 2019/0156241 | A1 | 5/2019 | Hughes |
| 2019/0156244 | A1 | 5/2019 | Faulhaber, Jr. |
| 2020/0311617 | A1 | 10/2020 | Swan et al. |
| 2021/0150405 | A1 | 5/2021 | Kitano |

FOREIGN PATENT DOCUMENTS

| | | | |
|---|---|---|---|
| CN | 105550374 | A | 5/2016 |
| CN | 105575389 | A | 5/2016 |
| CN | 106204780 | A | 12/2016 |
| CN | 106471819 | A | 3/2017 |
| CN | 106502889 | A | 3/2017 |
| CN | 106529673 | A | 3/2017 |
| CN | 106648994 | A | 5/2017 |
| CN | 106856508 | A | 6/2017 |
| CN | 107124276 | A | 9/2017 |
| CN | 107195186 | A | 9/2017 |
| JP | 2005185560 | A | 7/2005 |
| JP | 2014532935 | A | 12/2014 |
| JP | 2017091479 | A | 5/2017 |
| JP | 2017187850 | A | 10/2017 |
| JP | 2017199149 | A | 11/2017 |
| JP | 2021504832 | A | 2/2021 |
| WO | 2017159614 | A1 | 9/2017 |
| WO | 2019105189 | A | 6/2019 |

OTHER PUBLICATIONS

Osroca. “Alternative Keys Fine Grained, REST API Access to Your Machine Learning Resources”. May 3, 2013, BigML Blog. Last accessed https://blog.bigml.com/2013/05/03/alternative-keys-fine-grained-rest-api-access-to-your-machine-learning-resources/ on Mar. 26, 2026. (Year: 2013).*

Amazon web services: “Overview of security processes”, dated Jun. 2014. total 68 pages.

Hosseini, M. et al., “Real-time Epileptic Seizure Detection from EEG Signals via Random Subspace Ensemble Learning,” IEEE International Conference on Autonomic Computing (ICAC), 2016; pp. 209-218 (10 total pages).

Winsdons,“How to quickly build your own machine learning application on Alibaba Cloud” May 19, 2017, with English translation total 23 pages, blog.csdn.net/qq_36510261/article/details/72533550.

* cited by examiner

MODEL TRAINING SYSTEM AND METHOD, AND STORAGE MEDIUM

CROSS-REFERENCE TO RELATED APPLICATIONS

This application is a continuation of U.S. patent Ser. No. 16/883,026, filed on May 26, 2020, which is a continuation of International Application No. PCT/CN2018/114082, filed on Nov. 6, 2018, which claims priority to Chinese Patent Application No. 201711227185.X, filed on Nov. 29, 2017. All of the aforementioned patent applications are hereby incorporated by reference in their entireties.

TECHNICAL FIELD

The present invention relates to the machine learning field, and in particular, to a model training system and method, and a storage medium.

BACKGROUND

Deep learning is widely applied to fields such as artificial intelligence and computer vision. Model training needs to be performed in deep learning. In a model training process, a model developer needs to design a specific model and performs a plurality of times of iterative training by using a data set, to obtain a deep learning model that meets an expected requirement. The data set is a key to determining whether stability and precision of a trained model meet the expected requirement. The data set may be provided by a data provider.

At this stage, a user may purchase data download permission at the data provider. After the data download permission is approved, the user may download data and locally store the data. When model training needs to be performed, the downloaded data that is locally stored is copied to a model training system to implement model training. However, there is a relatively big risk of leaking the downloaded data that is locally stored.

SUMMARY

This application provides a model training system and method, and a storage medium, to reduce a risk of leaking training data.

According to a first aspect, this application provides a model training system, including a cloud data storage platform and a cloud model training platform. The cloud data storage platform is configured to: store training data; and receive a training data calling request, and export training data corresponding to a data calling instruction to the cloud model training platform based on the training data calling request. The cloud model training platform is configured to: receive a model training creation instruction to obtain a to-be-trained model; generate the training data calling request, and send the training data calling request to the cloud data storage platform; and train the to-be-trained model by using the training data exported from the cloud data storage platform, to obtain a training result model.

According to the first aspect, in a first possible implementation of the first aspect, the model training system further includes a data retrieval platform and an authentication center, and the cloud data storage platform includes an authority gateway. The data retrieval platform is configured to: establish a data index table based on training data provided by a data provider; receive a retrieval instruction, perform data retrieval in the data index table according to the retrieval instruction, and generate a retrieval result; and receive a data selection instruction of a user terminal for the retrieval result, and initiate an authentication permission request to the authentication center according to the data selection instruction, where the authentication permission request includes a data identifier of the training data. The authentication center is configured to: receive the authentication permission request, create a data token of the data identifier based on the authentication permission request, and deliver the data token to the authority gateway and the user terminal. The cloud model training platform is further configured to send the training data calling request to the authority gateway, where the training data calling request includes the data token delivered by the authentication center to the user terminal. The authority gateway is configured to: establish a first correspondence, where the first correspondence is a one-to-one correspondence between the data identifier and the data token; receive the training data calling request, and search the first correspondence for a target data identifier based on the data token in the training data calling request, where the target data identifier is the data identifier corresponding to the data token in the training data calling request; and export training data corresponding to the target data identifier to the cloud model training platform.

According to the first aspect, in a second possible implementation of the first aspect, the model training system further includes a data retrieval platform and an authentication center, and the cloud data storage platform includes an authority gateway and at least one data storage server. The data retrieval platform is configured to: establish a data index table based on training data provided by a data provider; receive a retrieval instruction, perform data retrieval in the data index table according to the retrieval instruction, and generate a retrieval result; and receive a data selection instruction of a user terminal for the retrieval result, and initiate an authentication permission request to the authentication center according to the data selection instruction, where the authentication permission request includes a data identifier of the training data. The authentication center is configured to: receive the authentication permission request, create a data token of the data identifier based on the authentication permission request, and deliver the data token to the authority gateway and the user terminal. The cloud model training platform is further configured to send the training data calling request to the authority gateway, where the training data calling request includes the data token delivered by the authentication center to the user terminal. The authority gateway is configured to: establish a second correspondence, where the second correspondence is a correspondence between the data token and a data route, and the data route includes a uniform resource locator path of the training data; receive the training data calling request, and search the second correspondence for a target data route based on the data token in the training data calling request, where the target data route is the data route corresponding to the data token in the training data calling request; and access a target data storage server to export, to the cloud model training platform, training data indicated by the target data route in the target data storage server, where the target data storage server is a data storage server corresponding to the target data route.

According to the second possible implementation of the first aspect, in a third possible implementation of the first aspect, the model training system further includes an access router, and the authority gateway exports the training data indicated by the target data route from the target data storage server through a predetermined standard access interface in the access router.

According to the first possible implementation or the second possible implementation of the first aspect, in a fourth possible implementation of the first aspect, the authority gateway is further configured to: obtain an update determining parameter, and determine whether the update determining parameter meets an update condition; send an update request to the authentication center if determining that the update determining parameter meets the update condition; and update the data token synchronously with the authentication center. The authentication center is further configured to: receive the update request, and update the data token based on the update request.

According to the fourth possible implementation of the first aspect, in a fifth possible implementation of the first aspect, the update determining parameter includes a count of rejecting the authentication permission request. The authority gateway is further configured to: detect a process of processing the authentication permission request by the authentication center, and send the update request to the authentication center if detecting that a count of rejecting the authentication permission request by the authentication center exceeds a rejection count update threshold in the update condition.

According to the fifth possible implementation of the first aspect, in a sixth possible implementation of the first aspect, the update determining parameter includes a count of calling the training data. The authority gateway is further configured to: obtain a count of calling the training data in a period of time, and send the update request to the authentication center if the count of calling the same training data in the period of time exceeds a calling count update threshold in the update condition.

According to the first aspect, in a seventh possible implementation of the first aspect, the cloud model training platform is further configured to: after obtaining the training result model through training, destroy the training data and the to-be-trained model used for training the training result model in the cloud model training platform.

According to the first aspect, in an eighth possible implementation of the first aspect, the model training system further includes a data audit system. The data audit system is configured to: perform validity verification on training data uploaded by a data provider, and reject storing training data failed in validity verification into the cloud data storage platform.

According to the first aspect, in a ninth possible implementation of the first aspect, the model training system further includes a cloud model storage platform. The cloud model storage platform is configured to: provide the to-be-trained model, and store the training result model.

According to the ninth possible implementation of the first aspect, in a tenth possible implementation of the first aspect, the model training system further includes an image platform and a model inference platform. The image platform is configured to store a model inference runtime environment. The model inference platform is configured to: receive an inference request, where the inference request includes to-be-processed data; and load the model inference runtime environment from the image platform, call the training result model from the cloud model storage platform, and import the to-be-processed data into the training result model for model inference.

According to a second aspect, this application provides a model training method, including: receiving, by a cloud model training platform, a model training creation instruction to obtain a to-be-trained model; generating, by the cloud model training platform, a training data calling request, and sending the training data calling request to a cloud data storage platform, to call training data stored in the cloud data storage platform; receiving, by the cloud data storage platform, the training data calling request, and exporting training data corresponding to the training data calling request to the cloud model training platform; and training, by the cloud model training platform, the to-be-trained model by using the training data exported from the cloud data storage platform, to obtain a training result model.

According to the second aspect, in a first possible implementation of the second aspect, the model training method further includes: establishing, by a data retrieval platform, a data index table based on training data provided by a data provider; receiving, by the data retrieval platform, a retrieval instruction, performing data retrieval in the data index table according to the retrieval instruction, and generating a retrieval result; receiving, by the data retrieval platform, a data selection instruction of a user terminal, and initiating an authentication permission request to an authentication center according to the data selection instruction, where the authentication permission request includes a data identifier of the training data; receiving, by the authentication center, the authentication permission request, creating a data token of the data identifier based on the authentication permission request, and delivering the data token to an authority gateway and the user terminal; and establishing, by the authority gateway, a first correspondence based on the delivered data token, where the first correspondence is a one-to-one correspondence between the data identifier and the data token.

According to the first possible implementation of the second aspect, in a second possible implementation of the second aspect, the generating, by the cloud model training platform, a training data calling request, and sending the training data calling request to a cloud data storage platform includes: generating, by the cloud model training platform, the training data calling request, and sending the training data calling request to the authority gateway, where the training data calling request includes the data token delivered by the authentication center to the user terminal. The receiving, by the cloud data storage platform, the training data calling request, and exporting training data corresponding to the training data calling request to the cloud model training platform includes: receiving, by the authority gateway in the cloud data storage platform, the training data calling request, searching the first correspondence for a target data identifier based on the data token in the training data calling request, and exporting training data corresponding to the target data identifier to the cloud model training platform, where the target data identifier is the data identifier corresponding to the data token in the training data calling request.

According to the second aspect, in a third possible implementation of the second aspect, the model training method further includes: establishing, by a data retrieval platform, a data index table based on training data provided by a data provider; receiving, by the data retrieval platform, a retrieval instruction, performing data retrieval in the data index table according to the retrieval instruction, generating a retrieval result, and sending the retrieval result; receiving, by the data retrieval platform, a data selection instruction of a user terminal for the retrieval result, and initiating an authentication permission request to an authentication center according to the data selection instruction, where the authentication permission request includes a data identifier of the training data; receiving, by the authentication center, the authentication permission request, creating a data token of the data identifier based on the authentication permission request, and delivering the data token to an authority gateway and the user terminal; and establishing, by the authority gateway, a second correspondence based on the delivered data token, where the second correspondence is a correspondence between the data token and a data route, and the data route includes a uniform resource locator path of the training data.

According to the third possible implementation of the second aspect, in a fourth possible implementation of the second aspect, the generating, by the cloud model training platform, a training data calling request, and sending the training data calling request to a cloud data storage platform includes: generating, by the cloud model training platform, the training data calling request, and sending the training data calling request to the authority gateway, where the training data calling request includes the data token delivered by the authentication center to the user terminal. The receiving, by the cloud data storage platform, the training data calling request, and exporting training data corresponding to the training data calling request to the cloud model training platform includes: receiving, by the authority gateway in the cloud data storage platform, the training data calling request, and searching the second correspondence for a target data route based on the data token in the training data calling request, where the target data route is the data route corresponding to the data token in the training data calling request; and accessing, by the authority gateway, a target data storage server to export, to the cloud model training platform, training data indicated by the target data route in the target data storage server, where the target data storage server is a data storage server corresponding to the target data route.

According to the second aspect or any one of the first possible implementation to the fourth possible implementation of the second aspect, in a fifth possible implementation of the second aspect, the model training method further includes: obtaining, by the authority gateway, an update determining parameter, and determining whether the update determining parameter meets an update condition; sending, by the authority gateway, an update request to the authentication center if determining that the update determining parameter meets the update condition; receiving, by the authentication center, the update request, and updating the data token based on the update request; and updating, by the authority gateway, the data token synchronously with the authentication center.

According to the fifth possible implementation of the second aspect, in a sixth possible implementation of the second aspect, the update determining parameter includes a count of rejecting the authentication permission request. The obtaining, by the authority gateway, an update determining parameter, and determining whether the update determining parameter meets an update condition includes: detecting, by the authority gateway, a process of processing the authentication permission request by the authentication center, obtaining a count of rejecting the authentication permission request by the authentication center, and determining whether the count of rejecting the authentication permission request by the authentication center exceeds a rejection count update threshold in the update condition. The sending, by the authority gateway, an update request to the authentication center if determining that the update determining parameter meets the update condition includes: sending the update request to the authentication center if it is detected that the count of rejecting the authentication permission request by the authentication center exceeds the rejection count update threshold in the update condition.

According to the fifth possible implementation of the second aspect, in a seventh possible implementation of the second aspect, the update determining parameter includes a count of calling the training data. The obtaining, by the authority gateway, an update determining parameter, and determining whether the update determining parameter meets an update condition includes: obtaining, by the authority gateway, a count of calling the training data in a period of time, and determining whether the count of calling the same training data in the period of time exceeds a calling count update threshold in the update condition. The sending, by the authority gateway, an update request to the authentication center if determining that the update determining parameter meets the update condition includes: sending the update request to the authentication center if the count of calling the same training data in the period of time exceeds the calling count update threshold in the update condition.

According to the second aspect, in an eighth possible implementation of the second aspect, after the training, by the cloud model training platform, the to-be-trained model by using the training data exported from the cloud data storage platform, to obtain a training result model, the method further includes: destroying, by the cloud model training platform, the training data and the to-be-trained model used for training the training result model in the cloud model training platform.

According to the second aspect, in a ninth possible implementation of the second aspect, the model training method further includes: performing, by a data audit system, validity verification on training data uploaded by a data provider; and rejecting, by the data audit system, storing training data failed in validity verification into the cloud data storage platform.

According to the second aspect, in a tenth possible implementation of the second aspect, after the training, by the cloud model training platform, the to-be-trained model by using the training data exported from the cloud data storage platform, to obtain a training result model, the method further includes: storing, by the cloud model storage platform, the training result model.

According to the tenth possible implementation of the second aspect, in an eleventh possible implementation of the second aspect, the model training method further includes: receiving, by a model inference platform, an inference request, where the inference request includes to-be-processed data; and loading, by the model inference platform, a model inference runtime environment from an image platform, calling the training result model from the cloud model storage platform, and importing the to-be-processed data into the training result model for model inference.

According to a third aspect, this application provides a storage medium, where the storage medium stores a program, and when the program is executed by a processor, the model training method in the foregoing technical solution is implemented.

This application provides a model training system and method, and a storage medium, which can be applied to a deep learning scenario. The model training system may include a cloud data storage platform and a cloud model training platform. The cloud data storage platform stores training data. The cloud model training platform receives a model training creation instruction from a user to trigger execution of model training. The cloud model training platform sends a training data calling request to the cloud data storage platform to call the training data stored in the cloud data storage platform. The cloud model training platform performs model training by using an obtained to-be-trained model and training data exported from the cloud data storage platform. In this application, the cloud data storage platform and the cloud model training platform are independent of each other, so that two functions of training data storage and model training are separated. The cloud data storage platform and the cloud model training platform are both implemented based on a cloud system, and a model training process is performed in the cloud system. A user that performs model training cannot locally download the training data, and the training data is stored in the cloud data storage platform and in the cloud model training platform that is performing model training. In other words, the training data cannot be leaked from a local user side, thereby reducing a risk of leaking the training data.

DESCRIPTION OF EMBODIMENTS

Figure 1:
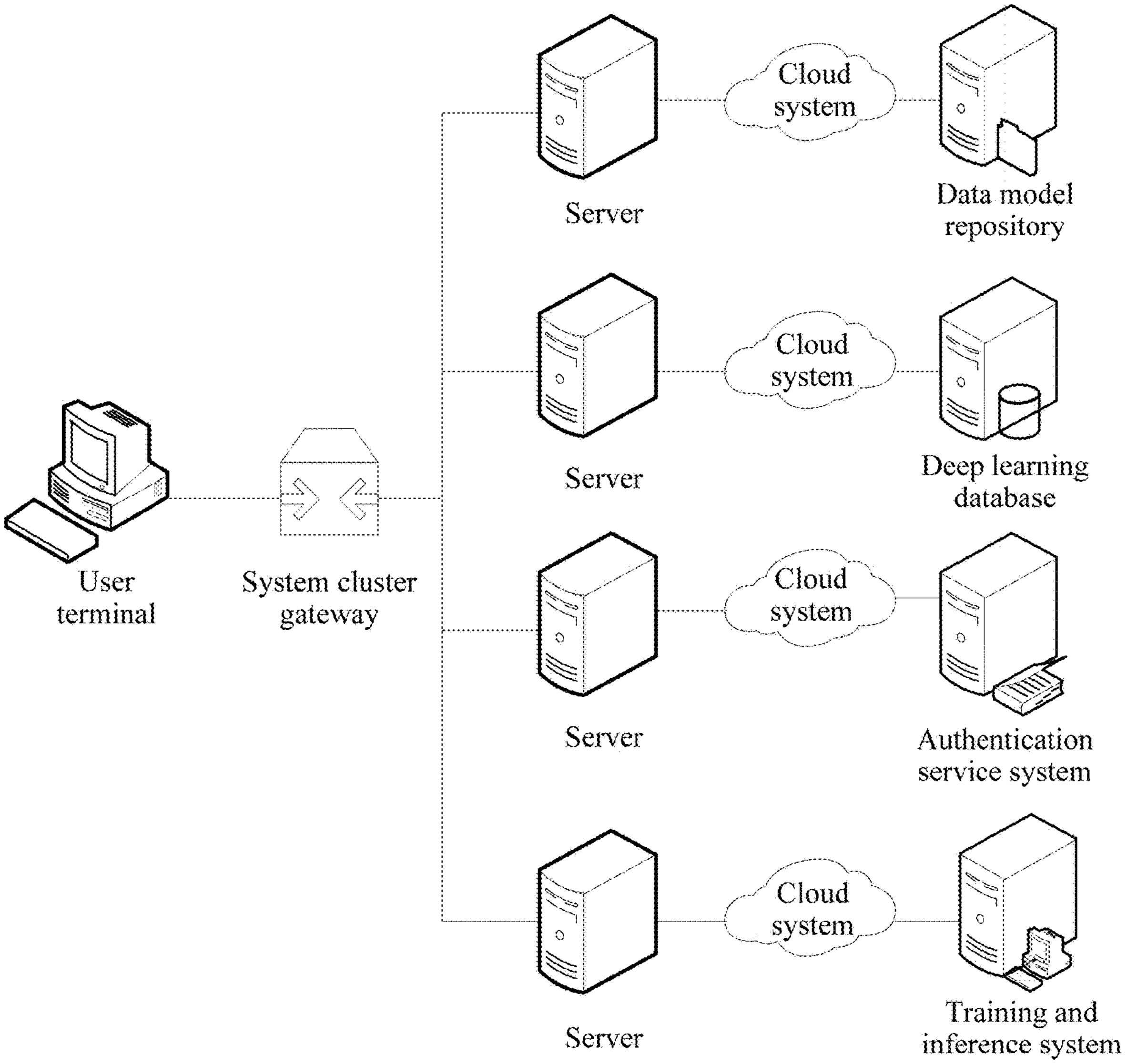
FIG. 1 is a schematic diagram of an application scenario of a model training system according to an embodiment of the present invention.

Embodiments of the present invention provide a model training system and method, and a storage medium, which can be applied to a deep learning scenario, to implement training of a deep learning model and application of the deep learning model. For example, inference is performed by using a trained deep learning model. The model training system in the embodiments of the present invention may complete functions such as model training and model inference in a cloud. FIG. 1 is a schematic diagram of an application scenario of a model training system according to an embodiment of the present invention. As shown in FIG. 1, the model training system may run in a cloud service system, and the cloud service system may include a cloud system and a system cluster gateway that provides an external access interface. A user may access the cloud system through a network and a user terminal by using an account and a password. The cloud system includes a plurality of internal network interworking servers. The model training system may store and provide training data and a training model by using a data model repository. The model training system may implement man-machine interaction between the model training system and the user by using a deep learning database, complete authentication on various rights of the user and the model training system by using an authentication service system, and complete model training and inference by using a training and inference system.

Figure 2:
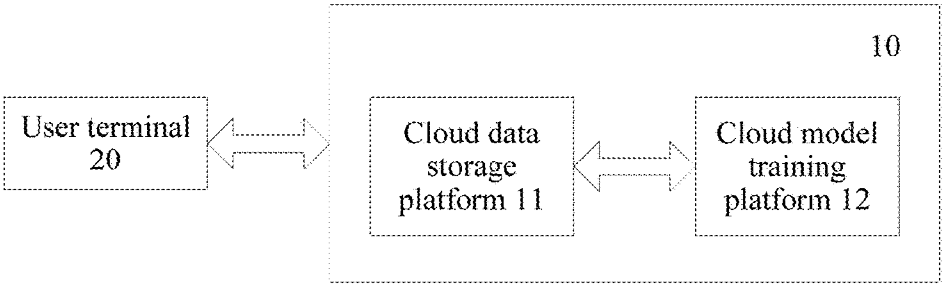
FIG. 2 is a schematic structural diagram of a model training system according to an embodiment of the present invention.

FIG. 2 is a schematic structural diagram of a model training system according to an embodiment of the present invention. As shown in FIG. 2, the model training system includes a cloud data storage platform 11 and a cloud model training platform 12.

The cloud data storage platform 11 is configured to: store training data; and receive a training data calling request, and export training data corresponding to a data calling instruction to the cloud model training platform 12 based on the training data calling request.

The training data is data required by a training model. The cloud data storage platform 11 may store a plurality of pieces of training data. The training data may be considered as a data set including a plurality of pieces of data. The training data may include an image, a video, audio, and the like, and is not limited herein. When the cloud data storage platform 11 stores the training data, a data identifier may be allocated to the training data, and the data identifier is used to identify the training data and may be used as an identifier for searching for a data storage location. In an example, to distinguish between different training data, the training data has a unique data identifier. In other words, data identifiers of the different training data are different.

The cloud data storage platform 11 may receive training data uploaded by a data provider. For example, the data provider may access a back end of a cloud system through a client by using a hypertext transfer protocol (HTTP), to exchange information with the cloud data storage platform 11. In an example, the cloud data storage platform 11 may provide the data provider with a standard protocol for uploading the training data, and the standard protocol may include a data format, a compression format, a data type, and the like. The cloud data storage platform 11 may detect the training data uploaded by the data provider, and if determining that the training data uploaded by the data provider does not conform to the standard protocol, the cloud data storage platform 11 may reject storing the training data that does not conform to the standard protocol.

A backup area may be set in the cloud data storage platform 11, and the backup area may be used to back up the training data to avoid a data accident, for example, data cannot be restored due to a misoperation.

The training data calling request is generated and sent by the cloud model training platform 12, and training data that the cloud model training platform 12 requests to call may be learned of based on the training data calling request. In an example, the training data calling request may include the data identifier. The cloud data storage platform 11 receives the training data calling request, and may search for the training data that the training data calling request requires to call, and export, to the cloud model training platform 12, the training data requested to be called, so that the cloud model training platform 12 performs model training by using the exported training data.

The cloud model training platform 12 is configured to: receive a model training creation instruction to obtain a to-be-trained model; generate the training data calling request, and send the training data calling request to the cloud data storage platform 11; and train the to-be-trained model by using the training data exported from the cloud data storage platform 11, to obtain a training result model.

The cloud model training platform 12 may obtain a to-be-trained model uploaded by a user or a model provider, or may obtain the to-be-trained model from a model database in the cloud system.

In an example, the user may access the back end of the cloud system through a user terminal 20 by using the hypertext transfer protocol, to exchange information with the cloud model training platform 12. The user may send a model training creation request to the cloud model training platform 12 by using the user terminal 20, to trigger the cloud model training platform 12 to create a model training task. The cloud model training platform 12 may perform model training by using the to-be-trained model and the training data. For example, model training may mean that the training data is imported into the to-be-trained model for a plurality of times of iterative training, to obtain a trained model, namely, the training result model.

It should be noted that the user, the data provider, or the model provider may use the user terminal 20.

The cloud data storage platform 11 in this embodiment of the present invention may be considered as a part of the data model repository in FIG. 1. The cloud model training platform 12 in this embodiment of the present invention may be considered as a part of the training and inference system in FIG. 1.

In this embodiment of the present invention, the cloud data storage platform 11 and the cloud model training platform 12 are independent of each other, so that two functions of training data storage and model training are separated. The cloud data storage platform 11 and the cloud model training platform 12 are both implemented based on the cloud system, and a model training process is performed in the cloud system. A user that performs model training cannot locally download the training data, and the training data is stored in the cloud data storage platform 11 and in the cloud model training platform 12 that is performing model training. In other words, the training data cannot be leaked from a local user side, thereby reducing a risk of leaking the training data.

Figure 3:
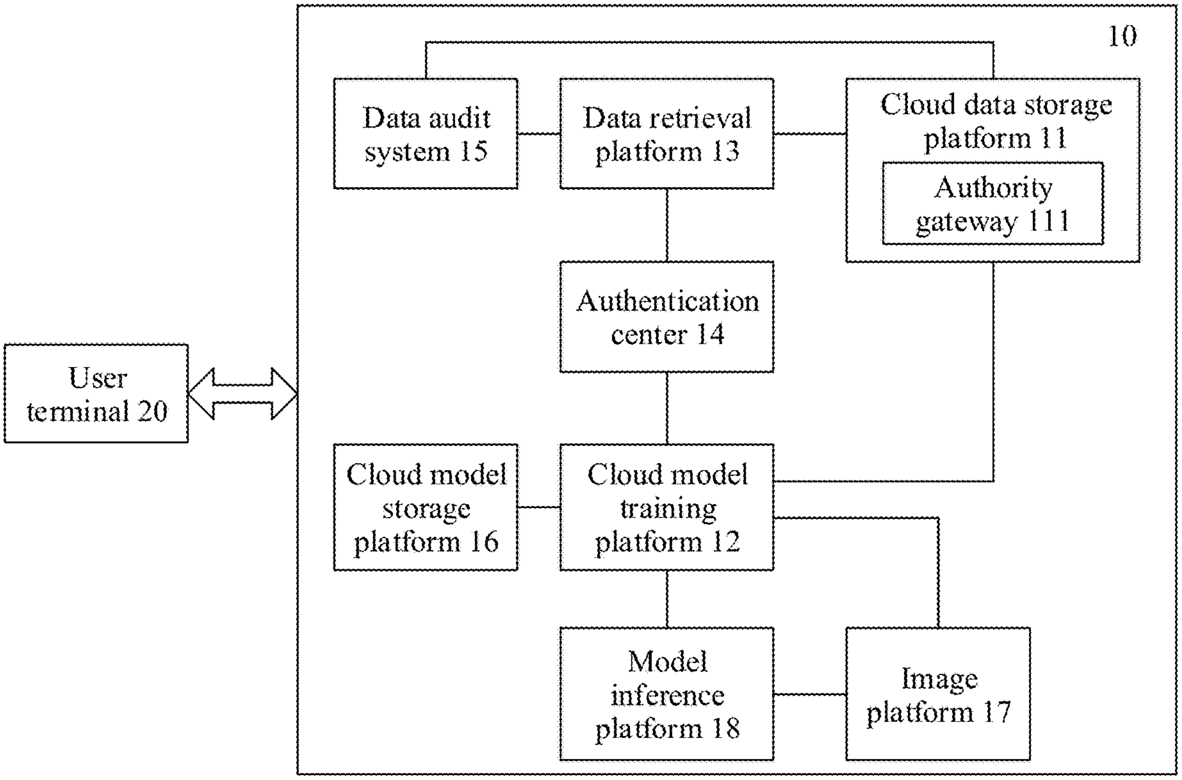
FIG. 3 is a schematic structural diagram of a model training system according to another embodiment of the present invention.

FIG. 3 is a schematic structural diagram of a model training system according to another embodiment of the present invention. FIG. 3 differs from FIG. 2 in that the cloud data storage platform 11 in FIG. 2 further includes an authority gateway 111 in FIG. 3 and the model training system shown in FIG. 3 may further include a data retrieval platform 13, an authentication center 14, a data audit system 15, a cloud model storage platform 16, an image platform 17, and a model inference platform 18.

The data retrieval platform 13 is configured to establish a data index table based on training data provided by a data provider. A user may search for and query, by using the data retrieval platform 13, training data stored in the cloud data storage platform 11.

In an example, after the data provider uploads the training data, the data retrieval platform 13 may analyze and process the training data to obtain basic data information of the training data such as a data set size, a data set scale, data owner information, and a data upload date, so that the user can learn of the basic information of the training data.

In an example, the cloud data storage platform 11 may further require the data provider to provide a label of the training data when the data provider uploads the training data. The label of the training data may represent a feature of the training data. Specifically, the label of the training data may be a keyword of content represented by the training data. For example, when the data provider uploads the training data, labels marked for the training data are "license plate" and "compact car". In a process of establishing the data index table, the data retrieval platform 13 may further add the label of the training data to the data index table, so that the user can use the feature of the training data for retrieval when retrieving the training data.

The data retrieval platform 13 is configured to: receive a retrieval instruction, perform data retrieval in the data index table according to the retrieval instruction, and generate a retrieval result. Specifically, the retrieval instruction may include one or more retrieval keywords, and searching may be performed in the label of the training data in the data index table based on the retrieval keyword. The retrieval result may include information about training data related to the retrieval keyword in the retrieval instruction, such as a name, a number, and a keyword of the training data and some data examples in the training data. In an example, the retrieval result may include information about training data sequentially arranged based on degrees of relevance to the retrieval keyword, so that the user can more intuitively obtain training data most related to the retrieval keyword. In another example, information about a fixed quantity of pieces of training data may be randomly selected through screening from information about training data retrieved based on the retrieval keyword and is provided for the user. For example, a retrieval result generated during each retrieval includes information about ten pieces of training data. The data retrieval platform 13 may send the retrieval result to a user terminal 20, and the user terminal 20 may display the retrieval result.

After receiving the retrieval result, the user may further send a data selection instruction for the retrieval result by using the user terminal 20. The data retrieval platform receives the data selection instruction of the user terminal 20 for the retrieval result, and initiates an authentication permission request to the authentication center 14 according to the data selection instruction. The data selection instruction may be used to instruct to select information about one or more pieces of training data in the retrieval result, to determine training data required for model training.

After the training data required for model training is determined, the authentication permission request is initiated to the authentication center 14, where the authentication permission request may include a data identifier of the training data; and calling permission of the training data is requested from the authentication center 14.

The data retrieval platform 13 in this embodiment of the present invention may be considered as at least a part of the deep learning database in FIG. 1.

The authentication center 14 is configured to: receive the authentication permission request, create a data token of the data identifier based on the authentication permission request, and deliver the data token to the authority gateway 111 and the user terminal 20.

The authentication permission request is used to request the calling permission of the training data. The authentication center 14 may determine whether to approve the authentication permission request sent by the data retrieval platform 13. For example, the authentication permission request may include payment information for the training data. If the payment information indicates that the user has successfully paid for the training data, the authentication center 14 may approve the authentication permission request, and create the data token of the data identifier. After approving the authentication permission request, the authentication center 14 may further generate and store data authentication information. The data authentication information may include a user identifier and the data identifier. For example, the data authentication information may have effective duration, that is, if the user requests the same training data again within the effective duration, the authentication center 14 may directly approve the authentication permission request without audit. The effective duration may be set based on an operating scenario and an operating requirement, and is not limited herein. For example, the effective duration may be one year or permanent.

The data token may identify training data in an operation, and is used as a security credential for data calling. For example, the data token identifies training data in a data calling operation in a subsequent process. In an example, the data token may be implemented as a security plug-in. The authentication center 14 delivers the created data token to the user terminal 20, so that the user terminal 20 can use the data token to export training data corresponding to the data token from the cloud data storage platform 11 by using the authority gateway 111. In addition, the authentication center 14 further stores the created data token in the authentication center 14.

The cloud model training platform 12 is further configured to send a training data calling request to the authority gateway 111, where the training data calling request includes the data token delivered by the authentication center 14 to the user terminal 20.

For example, when requesting the training data, the user terminal 20 may add the data token to a model training creation instruction. The cloud model training platform 12 may parse the model training creation instruction to obtain the data token delivered to the user terminal 20, and add the data token delivered to the user terminal 20 to the training data calling request. The cloud model training platform 12 calls the training data corresponding to the data token from the cloud data storage platform 11 by using the data token in the training data calling request.

In an implementation, the cloud data storage platform 11 may be specifically implemented as a third-party public server. The third-party public server does not belong to the data provider, a model provider, and the user, and is a common server for storing the training data and exporting the training data. The training data may be called through authorization by using a correspondence between the data token and the data identifier.

The authority gateway 111 is configured to establish a first correspondence, where the first correspondence is the correspondence between the data identifier and the data token. The data identifier is in a one-to-one correspondence with the data token, and the data token is unique. In other words, different data identifiers correspond to different data tokens. When receiving the training data calling request, the authority gateway 111 searches the first correspondence for a target data identifier based on the data token in the training data calling request, where the target data identifier is the data identifier corresponding to the data token in the training data calling request; and exports training data corresponding to the target data identifier to the cloud model training platform 12.

After the cloud data storage platform 11 receives the training data calling request, the authority gateway 111 compares the data token in the training data calling request with a data token stored in the authority gateway 111. If the data token in the training data calling request can match the data token stored in the authority gateway 111, the training data is allowed to be called, and the training data corresponding to the data token in the training data calling request is exported.

To ensure data security in a model training process and avoid unauthorized use of the training data, the data token may be updated based on an actual situation. The authority gateway 111 may be configured to: obtain an update determining parameter, and determine whether the update determining parameter meets an update condition. The authority gateway 111 sends an update request to the authentication center 14 if determining that the update determining parameter meets the update condition, and updates the data token synchronously with the authentication center 14. The authentication center 14 receives the update request, and updates the data token based on the update request.

The update determining parameter may include one or more of parameters such as a count of rejecting the authentication permission request, a count of calling the training data, and existence duration of the data token.

For example, the update determining parameter includes the count of rejecting the authentication permission request. The authority gateway 111 may detect a process of processing the authentication permission request by the authentication center 14, to obtain a count of rejecting the authentication permission request by the authentication center 14. The authority gateway 111 sends the update request to the authentication center 14 if detecting that the count of rejecting the authentication permission request by the authentication center 14 exceeds a rejection count update threshold in the update condition.

The rejection count update threshold may be set based on an operating scenario and an operating requirement, and is not limited herein. The authentication center 14 deletes an original data token, generates a new data token, and delivers the new data token to a user terminal and the authority gateway 111, so that the authority gateway 111 can update the data token synchronously with the authentication center 14. When the data token is updated in the authentication center 14 and the authority gateway 111, execution of the training data calling request needs to be stopped. After the update to the data token in the authentication center 14 and the authority gateway 111 is completed, the training data calling request is executed. After the update to the data token is completed, if the training data calling request still includes the original data token, the original data token in the training data calling request is invalid, and the training data cannot be called.

For another example, the update determining parameter includes the count of calling the training data. The authority gateway 111 may obtain a count of calling the training data in a period of time. The authority gateway 111 sends the update request to the authentication center 14 if determining that the count of calling the same training data in the period of time exceeds a calling count update threshold in the update condition. The period of time for counting the training data and the calling count update threshold may be set based on an operating scenario and an operating requirement, and are not limited herein.

For another example, the update determining parameter includes the existence duration of the data token. The authority gateway 111 may set update cycle duration of the data token and record the existence duration of the data token. The authority gateway 111 sends the update request to the authentication center 14 if determining that the existence duration of the data token reaches the update cycle duration. The update cycle duration of the data token may be set based on an operating scenario and an operating requirement, and is not limited herein.

It should be noted that the update determining parameter and the update condition are not limited to the foregoing examples. The authority gateway 111 may alternatively receive an update policy configuration instruction from the user, and set the update determining parameter and the update condition according to the update policy configuration instruction.

The cloud model storage platform 16 is configured to: provide a to-be-trained model, and store a training result model. The cloud model storage platform 16 may store a model uploaded by the model provider, or a training result model obtained by the cloud model training platform 12 through training.

In an example, after obtaining the training result model through training, the cloud model training platform 12 may send the training result model to the cloud model storage platform 16 for storage, and destroy the training data and the to-be-trained model used for training the training result model in the cloud model training platform 12, and may further destroy the training result model in the cloud model training platform 12, to prevent leakage of the training data, the to-be-trained model, and the training result model in the cloud model training platform 12.

In an example, prior to the cloud data storage platform 11, the data audit system 15 receives the training data uploaded by the data provider. The data audit system 15 is configured to: perform validity verification on the training data uploaded by the data provider, and reject storing training data failed in validity verification into the cloud data storage platform 11. For example, if the training data uploaded by the data provider is duplicated with the training data stored in the cloud data storage platform 11, or a data format of the data uploaded by the data provider does not conform to a standard protocol of the cloud data storage platform 11, the data audit system 15 determines that the training data uploaded by the data provider is invalid, that is, the uploaded training data fails in validity verification. If the data audit system 15 determines that the training data uploaded by the data provider is valid, a storage instruction may be sent to the cloud data storage platform 11 by using the data retrieval platform 13, so that the cloud data storage platform 11 permanently stores the training data uploaded by the data provider.

It should be noted that a manner of performing validity verification on the training data uploaded by the data provider is not limited to the foregoing manner. The data audit system 15 may ensure real validity of the training data used in the model training system.

The image platform 17 is configured to store a model inference runtime environment. Specifically, the model inference runtime environment may include a system environment and a runtime framework environment corresponding to the training result model.

The model inference platform 18 may receive an inference request, where the inference request includes to-be-processed data. The inference request may be sent by the user terminal 20. For example, the user terminal 20 may send the inference request to the model inference platform 18 through an application programming interface (API). After receiving the inference request, the model inference platform 18 loads the model inference runtime environment from the image platform 17, calls the training result model from the cloud model storage platform 16, and imports the to-be-processed data into the training result model for model inference.

The data retrieval platform in this embodiment of the present invention may be considered as at least a part of the deep learning database in FIG. 1. The authentication center 14 in this embodiment of the present invention may be considered as at least a part of the authentication service system in FIG. 1. The model inference platform 18 in this embodiment of the present invention may be considered as a part of the training and inference system in FIG. 1.

Figure 4:
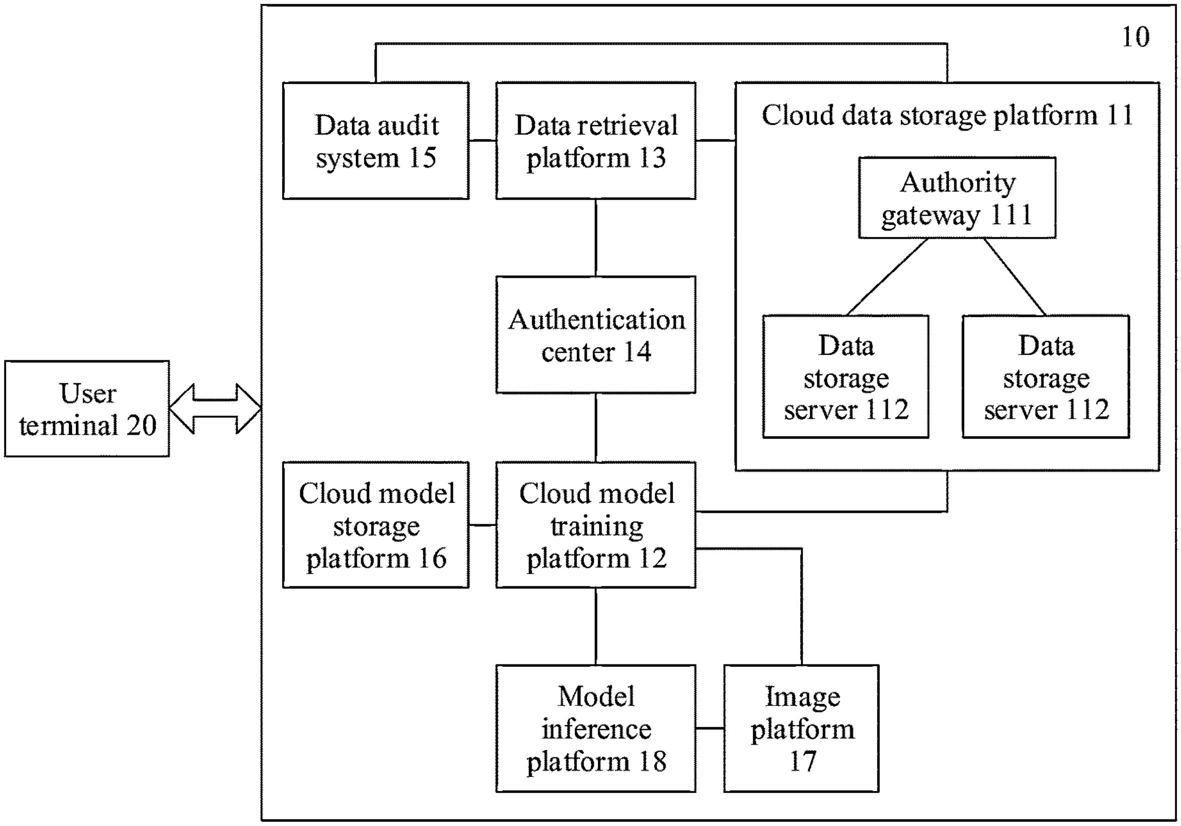
FIG. 4 is a schematic structural diagram of a model training system according to still another embodiment of the present invention.

FIG. 4 is a schematic structural diagram of a model training system according to still another embodiment of the present invention. The model training system shown in FIG. 4 differs from the model training system shown in FIG. 3 in that a cloud data storage platform 11 may be implemented as at least one private server of a data provider.

If the cloud data storage platform 11 includes an authority gateway 111 and at least one data storage server 112, namely, a private server, training data may be called through authorization by using a correspondence between a data token and a data route.

The data route may include a uniform resource locator (URL) path of the training data, and may further include a data access method and a standard for exporting training data from the cloud data storage platform 11. When uploading the training data, the data provider may further upload the data route corresponding to the training data to a data retrieval platform 13.

The data retrieval platform 13 may further detect validity of the data route. If it is determined that the data route is invalid, storage of the data route is rejected. For example, the data retrieval platform 13 rejects storing the data route if determining that the data route cannot be accessed or a format of the data route does not conform to a standard preset in the model training system. For example, the data retrieval platform 13 may send a rejection instruction to the authority gateway 111 and an authentication center 14, so that both the authority gateway 111 and the authentication center 14 reject storing route data.

The authority gateway 111 may establish a second correspondence, where the second correspondence is the correspondence between the data token and the data route. For example, the second correspondence may be implemented as a data route table. The training data has the corresponding data route, the training data is in a one-to-one correspondence with the data token, and the data token is also in a one-to-one correspondence with the data route. When the data retrieval platform 13 establishes a data index table, the corresponding data route may be stored in the authority gateway 111.

After receiving a training data calling request, the authority gateway 111 searches the second correspondence for a target data route based on the data token in the training data calling request. The target data route is the data route corresponding to the data token in the training data calling request. The authority gateway 111 may access a target data storage server 112 based on the data route corresponding to the data token, to export, to a cloud model training platform 12, training data indicated by the target data route in the target data storage server 112. The target data storage server 112 is the data storage server 112 corresponding to the target data route.

To ensure security of the training data in the data storage server 112, namely, the private server, secure encrypted remote access may be established. In an example, the model training system may further include an access router. The authority gateway 111 exports the training data indicated by the target data route from the target data storage server 112 through a predetermined standard access interface in the access router. For example, the standard access interface is a restful access interface, and a path of the restful access interface may be used as the data route.

In an example, to further ensure the security of the training data in the data storage server 112, the authority gateway 111 may randomly select the data token and verify validity of the data token. If the authority gateway 111 determines that the data token is invalid, the authority gateway 111 may update the data route table, that is, update the second correspondence, and specifically update the data token in the second correspondence.

Figure 5:
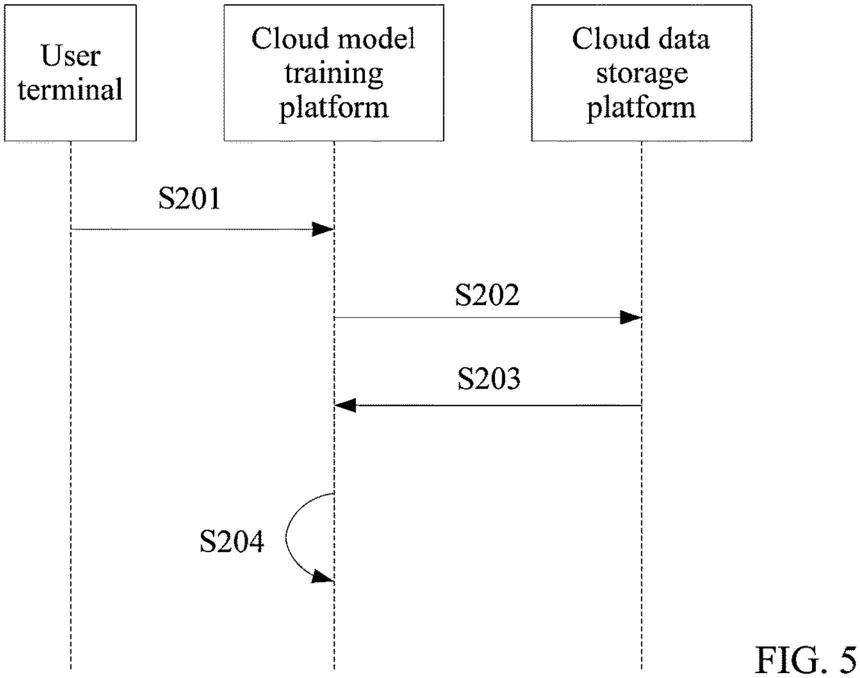
FIG. 5 is a flowchart of a model training method according to an embodiment of the present invention.

FIG. 5 is a flowchart of a model training method according to an embodiment of the present invention. The model training method can be applied to the model training system in the foregoing embodiment. As shown in FIG. 5, the model training method may include step S201 to step S204.

In step S201, a cloud model training platform receives a model training creation instruction to obtain a to-be-trained model.

In step S202, the cloud model training platform generates a training data calling request, and sends the training data calling request to a cloud data storage platform, to call training data stored in the cloud data storage platform.

In step S203, the cloud data storage platform receives the training data calling request, and exports training data corresponding to the training data calling request to the cloud model training platform.

In step S204, the cloud model training platform trains the to-be-trained model by using the training data exported from the cloud data storage platform, to obtain a training result model.

For descriptions of step S201 to step S204, refer to related descriptions of the cloud model training platform and the cloud data storage platform in the foregoing embodiment.

In this embodiment of the present invention, the cloud data storage platform and the cloud model training platform are independent of each other, so that two functions of training data storage and model training are separated. The cloud data storage platform and the cloud model training platform are both implemented based on a cloud system, and a model training process is performed in the cloud system. A user that performs model training cannot locally download the training data, and the training data is stored in the cloud data storage platform and in the cloud model training platform that is performing model training. In other words, the training data cannot be leaked from a local user side, thereby reducing a risk of leaking the training data.

Figure 6:
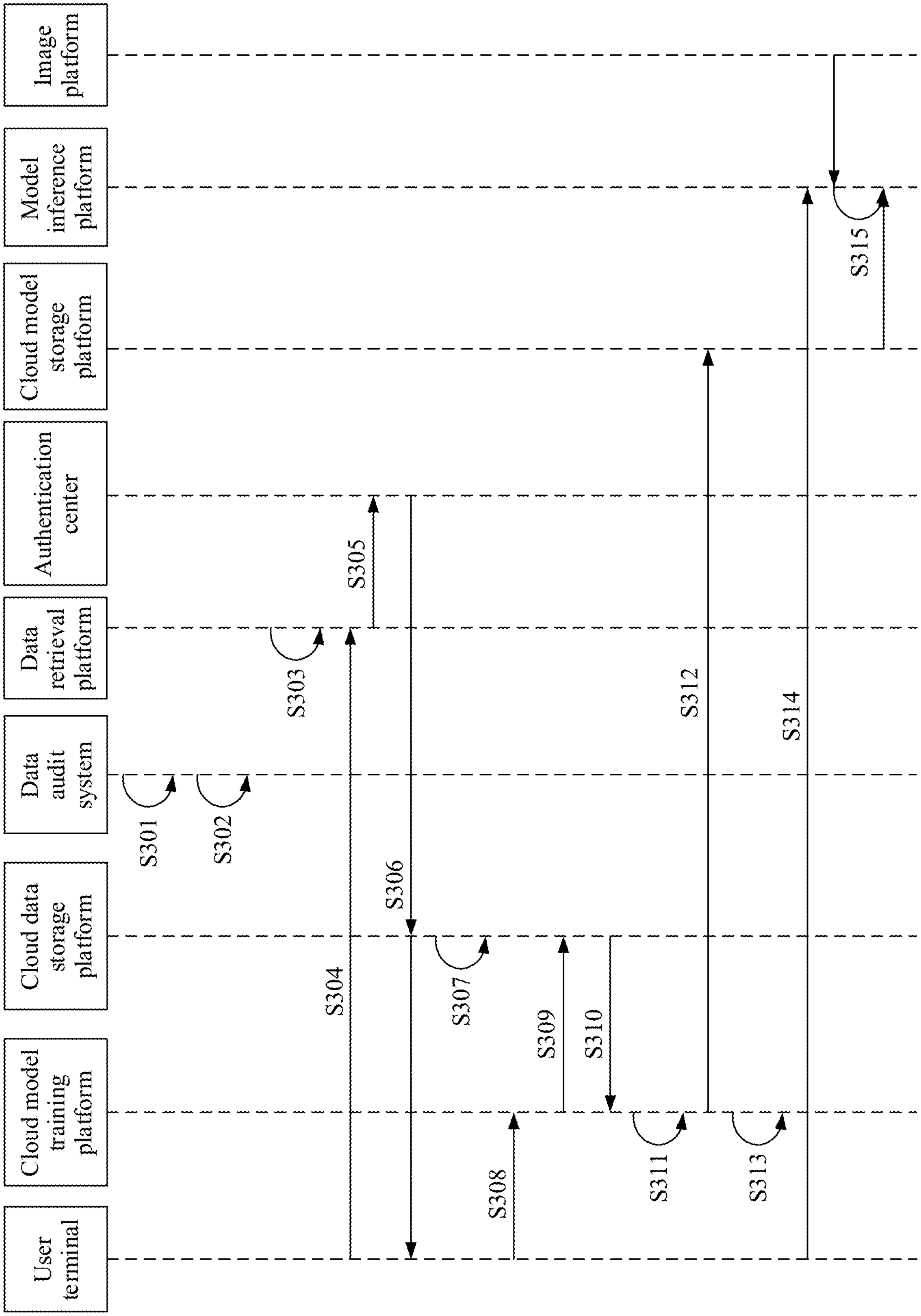
FIG. 6 is a flowchart of a specific implementation of a model training method according to an embodiment of the present invention.

FIG. 6 is a flowchart of a specific implementation of a model training method according to an embodiment of the present invention. As shown in FIG. 6, the model training method may include step S301 to step S315.

In step 301, a data audit system performs validity verification on training data uploaded by a data provider.

In step 302, the data audit system rejects storing training data failed in validity verification into a cloud data storage platform.

In step 303, a data retrieval platform establishes a data index table based on the training data provided by the data provider.

In step 304, the data retrieval platform receives a retrieval instruction, performs data retrieval in the data index table according to the retrieval instruction, and generates a retrieval result.

In step 305, the data retrieval platform receives a data selection instruction of a user terminal, and initiates an authentication permission request to an authentication center according to the data selection instruction.

The authentication permission request includes a data identifier of the training data.

In step 306, the authentication center receives the authentication permission request, creates a data token of the data identifier based on the authentication permission request, and delivers the data token to an authority gateway in the cloud data storage platform and the user terminal.

In step 307, the authority gateway in the cloud data storage platform establishes a first correspondence based on the delivered data token.

The first correspondence is a correspondence between the data identifier and the data token.

In step 308, a cloud model training platform receives a model training creation instruction to obtain a to-be-trained model.

In step 309, the cloud model training platform generates a training data calling request, and sends the training data calling request to the authority gateway in the cloud data storage platform, to call the training data stored in the cloud data storage platform.

The training data calling request includes the data token delivered by the authentication center to the user terminal.

In step 310, the authority gateway in the cloud data storage platform receives the training data calling request, searches the first correspondence for a target data identifier based on the data token in the training data calling request, and exports training data corresponding to the target data identifier to the cloud model training platform.

The target data identifier is the data identifier corresponding to the data token in the training data calling request.

In step 311, the cloud model training platform trains the to-be-trained model by using the training data exported from the cloud data storage platform, to obtain a training result model.

In step 312, the cloud model storage platform stores the training result model.

In step 313, the cloud model training platform destroys the training data and the to-be-trained model used for training the training result model in the cloud model training platform.

In step 314, a model inference platform receives an inference request, where the inference request includes to-be-processed data.

In step 315, the model inference platform loads a model inference runtime environment from an image platform, calls the training result model from the cloud model storage platform, and imports the to-be-processed data into the training result model for model inference.

Figure 7:
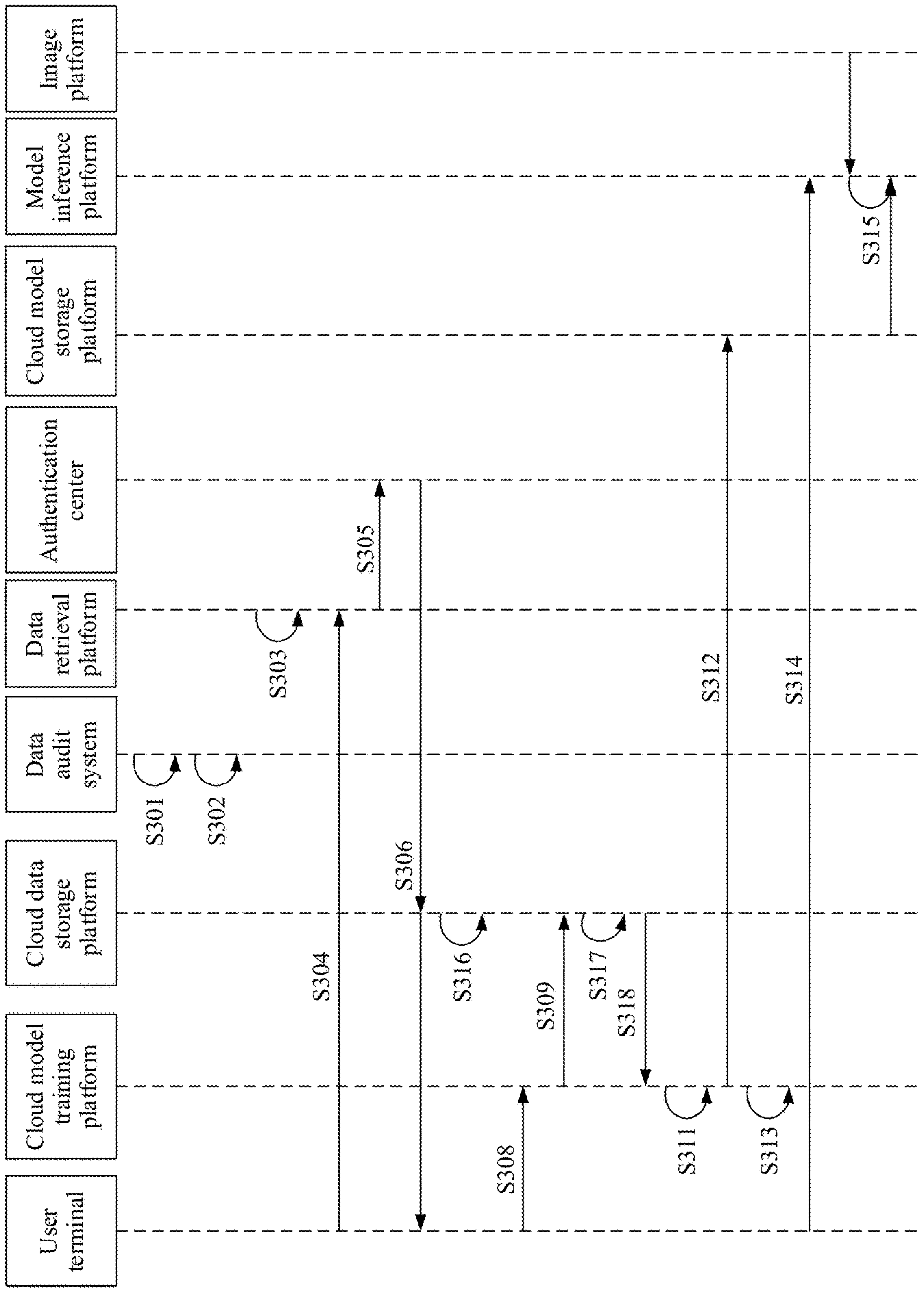
FIG. 7 is a flowchart of another specific implementation of a model training method according to an embodiment of the present invention.

FIG. 7 is a flowchart of another specific implementation of a model training method according to an embodiment of the present invention. FIG. 7 differs from FIG. 6 in that step S307 in FIG. 6 may be replaced with step S316 in FIG. 7, and step S310 in FIG. 6 may be replaced with step S317 and step S318 in FIG. 7.

In step S316, an authority gateway in the cloud data storage platform establishes a second correspondence based on the delivered data token.

The second correspondence is a correspondence between the data token and a data route. The data route includes a uniform resource locator path of the training data.

In step S317, the authority gateway in the cloud data storage platform receives the training data calling request, and searches the second correspondence for a target data route based on the data token in the training data calling request.

The target data route is the data route corresponding to the data token in the training data calling request.

In step S318, the authority gateway in the cloud data storage platform accesses a target data storage server to export, to the cloud model training platform, training data indicated by the target data route in the target data storage server.

The target data storage server is a data storage server corresponding to the target data route.

In an example, the data token may be further updated based on a specific scenario to ensure security of the training data. The authority gateway obtains an update determining parameter, and determines whether the update determining parameter meets an update condition. The authority gateway sends an update request to the authentication center if determining that the update determining parameter meets the update condition. The authentication center receives the update request, and updates the data token based on the update request. The authority gateway updates the data token synchronously with the authentication center.

For example, the update determining parameter includes a count of rejecting the authentication permission request. A process of the updating the data token may be specifically: the authority gateway detects a process of processing the authentication permission request by the authentication center, obtains a count of rejecting the authentication permission request by the authentication center, and determines whether the count of rejecting the authentication permission request by the authentication center exceeds a rejection count update threshold in the update condition; and sends the update request to the authentication center if detecting that the count of rejecting the authentication permission request by the authentication center exceeds the rejection count update threshold in the update condition.

For example, the update determining parameter includes a count of calling the training data. A process of updating the data token updating process may be specifically: the authority gateway obtains a count of calling the training data in a period of time, and determines whether the count of calling the same training data in the period of time exceeds a calling count update threshold in the update condition; and sends the update request to the authentication center if the count of calling the same training data in the period of time exceeds the calling count update threshold in the update condition.

For descriptions of the steps in the foregoing method embodiment, refer to related descriptions in the foregoing system embodiment.

An embodiment of the present invention may further provide a storage medium, where the storage medium stores a program, and when the program is executed by a processor, the model training method in the foregoing embodiment is implemented.

What is claimed is:

1. A model training system for providing cloud service, comprising a cloud data storage platform, a cloud model training platform, a cloud model storage platform, and a model inference platform, wherein:

the cloud data storage platform comprises at least one first processor and a first storage, wherein the at least one first processor is configured to receive training data uploaded to the cloud data storage platform by a data provider and a label of the training data provided by the data provider, wherein the label of the training data indicates content of the training data, and the first storage is configured to store the training data;

the cloud model storage platform comprises a second storage and the second storage is configured to store a to-be-trained model, wherein the to-be-trained model is uploaded to the cloud model storage platform by a model provider or a user;

the cloud model training platform comprises at least one second processor configured to receive a model training creation instruction from a terminal of the user, obtain the to-be-trained model from the cloud model storage platform, call the training data stored in the cloud data storage platform when the user has successfully paid for the training data, train the to-be-trained model by using the training data to obtain a training result model, and after obtaining the training result model, send the training result model to the cloud model storage platform;

the model inference platform comprises at least one third processor configured to call the training result model from the cloud model storage platform, and import to-be-processed data into the training result model for model inference.

2. The system according to claim 1, further comprising an authentication center, the authentication center comprises at least one fourth processor and the at least one fourth processor is configured to receive an authentication permission request, the authentication permission request includes payment information for the training data and is used to determine authority of the training data.

3. The system according to claim 1, further comprising a data retrieval platform, the data retrieval platform comprises at least one fifth processor and the at least one fifth processor is configured to acquire information of the training data, and the information of the training data comprises at least one of data owner information of the training data or data upload date of the training data.

4. The system according to claim 3, wherein the at least one fifth processor is further configured to:

establish a data index table based on at least one of the label of the training data or the information of the training data;

receive a retrieval instruction input by the user, wherein the retrieval instruction comprises a retrieval keyword;

perform data retrieval in the data index table according to the retrieval instruction; and generate a retrieval result, wherein the retrieval result comprises the label of the training data corresponding to the keyword or the information of the training data corresponding to the keyword.

5. The system according to claim 4, wherein the at least one fifth processor is further configured to:

send the retrieval result to a user terminal to display the retrieval result for the user; and receive a data selection instruction for the retrieval result sent by the user terminal, wherein the data selection instruction instructs the data retrieval platform to determine the training data from the retrieval result.

6. The system according to claim 1, wherein the training data is configured with a data route, and wherein the cloud model training platform is further configured to call the training data according to the data route.

7. The system according to claim 6, wherein the data route comprises a uniform resource locator (URL) path of the training data.

8. The system according to claim 1, further comprising an image platform, the image platform comprises at least one sixth processor and the at least one sixth processors is configured to store a model inference runtime environment, the model inference runtime environment includes a runtime framework environment corresponding to the training result model;

the at least one third processor of the model inference platform is further configured to load the model inference runtime environment from the image platform and import the to-be-processed data into the training result model for model inference in the model inference runtime environment.

9. The system according to claim 2, wherein the at least one fourth processor of the authentication center is further configured to create a data token when the payment information indicates that the user has successfully paid for the training data;

the at least one third processor of the model inference platform is further configured to retrieve the training data stored in the cloud data storage platform corresponding to the data token.

10. The system according to claim 1, wherein the training data is approved to be called for the user during an effective duration after the training data is successfully paid by the user.

11. A model training method for providing cloud service, comprising:

receiving, by a cloud data storage platform, training data uploaded by a data provider and a label of the training data provided by the data provider, wherein the label of the training data content of the training data;

storing the training data by the cloud data storage platform;

receiving, by a cloud model storage platform, a to-be-trained model uploaded by a model provider or a user;

storing the to-be-trained model by the cloud model storage platform;

receiving, by a cloud model training platform, a model training creation instruction from a terminal of the user;

obtaining, by the cloud model training platform, the to-be-trained model from the cloud model storage platform;

calling, by the cloud model training platform, the training data stored in the cloud data storage platform when the user has successfully paid for the training data;

training, by the cloud model training platform, the to-be-trained model by using the training data, to obtain a training result model;

sending, by the cloud model training platform, the training result model to the cloud model storage platform after obtaining the training result model;

calling, by a model inference platform, the training result model from the cloud model storage platform; and importing, by the model inference platform, to-be-processed data into the training result model for model inference.

12. The method according to claim 11, further comprising:

receiving, by an authentication center, an authentication permission request, the authentication permission request includes payment information for the training data and is used to determine authority of the training data.

13. The method according to claim 11, further comprising:

acquiring, by a data retrieval platform, information of the training data, wherein the information of the training data comprises at least one of data owner information of the training data or data upload date of the training data.

14. The method according to claim 13, further comprising:

establishing, by the data retrieval platform, a data index table based on at least one of the label of the training data or the information of the training data;

receiving, by the data retrieval platform, a retrieval instruction input by the user, wherein the retrieval instruction comprises a retrieval keyword;

performing, by the data retrieval platform, data retrieval in the data index table according to the retrieval instruction; and generating, by the data retrieval platform, a retrieval result, wherein the retrieval result comprises the label of the training data corresponding to the keyword or the information of the training data corresponding to the keyword.

15. The method according to claim 14, further comprising:

sending, by the data retrieval platform, the retrieval result to a user terminal for displaying the retrieval result for the user; and receiving, by the data retrieval platform, a data selection instruction for the retrieval result sent by the user terminal, wherein the data selection instruction instructs the data retrieval platform to determine the training data from the retrieval result.

16. The method according to claim 11, wherein the training data is configured with a data route, and the calling, by the cloud model training platform, the training data stored in the cloud data storage platform, comprises:

calling, by the cloud model training platform, the training data according to the data route.

17. The method according to claim 16, wherein the data route comprises a uniform resource locator (URL) path of the training data.

18. The method according to claim 11, further comprising:

storing, by an image platform, a model inference runtime environment, the model inference runtime environment includes a runtime framework environment corresponding to the training result model;

wherein the importing, by the model inference platform, to-be-processed data into the training result model for model inference, comprises:

loading, by the model inference platform, the model inference runtime environment from the image platform and importing, by the model inference platform, the to-be-processed data into the training result model for model inference in the model inference runtime environment.

19. The method according to claim 12, further comprising:

creating, by the authentication center, a data token when the payment information indicates that the user has successfully paid for the training data;

wherein the calling, by the cloud model training platform, the training data stored in the cloud data storage platform when the user has successfully paid for the training data, comprises:

calling the training data stored in the cloud data storage platform corresponding to the data token.

20. The method according to claim 11, wherein the training data is approved to be called for the user during an effective duration after the training data is successfully paid by the user.

* * * * *